United States Patent
Johnson

(10) Patent No.: US 9,073,738 B2
(45) Date of Patent: Jul. 7, 2015

(54) REDUCED LOAD OFFSET LOSS INTEGRATED LIFT TRUCK ATTACHMENT

(75) Inventor: Thomas H. Johnson, Winnebago, MN (US)

(73) Assignee: Illinois Tool Works Inc., Glenview, IL (US)

( * ) Notice: Subject to any disclaimer, the term of this patent is extended or adjusted under 35 U.S.C. 154(b) by 97 days.

(21) Appl. No.: 13/147,763

(22) PCT Filed: Feb. 5, 2010

(86) PCT No.: PCT/US2010/023268
§ 371 (c)(1),
(2), (4) Date: Sep. 7, 2011

(87) PCT Pub. No.: WO2010/091219
PCT Pub. Date: Aug. 12, 2010

(65) Prior Publication Data
US 2011/0318153 A1    Dec. 29, 2011

Related U.S. Application Data

(60) Provisional application No. 61/151,029, filed on Feb. 9, 2009.

(51) Int. Cl.
*B66F 9/14* (2006.01)
*B66F 9/12* (2006.01)
*G01G 19/08* (2006.01)
*G01G 23/37* (2006.01)

(52) U.S. Cl.
CPC ... *B66F 9/14* (2013.01); *B66F 9/12* (2013.01); *G01G 19/083* (2013.01); *G01G 23/3728* (2013.01)

(58) Field of Classification Search
CPC ........... B66F 9/142; B66F 9/143; B66F 9/144
USPC .................................................. 414/607, 667
See application file for complete search history.

(56) References Cited

U.S. PATENT DOCUMENTS 3,066,807 A    12/1962   Draxler
3,738,512 A *   6/1973   Marsden ....................... 414/670
(Continued)

FOREIGN PATENT DOCUMENTS

DE    3744194    7/1989
JP    50118666   9/1975
(Continued)

OTHER PUBLICATIONS

Avery Weigh Tronix—Forklift Truck Scale, Brochure 2006, http://web.archive.org/web/20061110123054/http://www.wtxweb.com/literature/FkLift%20Truck%20US.pdf.*
(Continued)

*Primary Examiner* — Jonathan Snelting
(74) *Attorney, Agent, or Firm* — Levenfeld Pearlstein, LLC

(57) ABSTRACT

A lift truck attachment for attaching a device, such as a scale to the lift truck includes an upper carriage support, a lower carriage support spaced from and opposing the upper carriage support and a device attachment region disposed between and essentially flush with the upper and lower carriage supports. The device is attached between the upper and lower carriage supports and nests with the upper and lower carriage supports to reduce the effective distance between the lift truck mast and the load carrying members, such as the loading forks.

7 Claims, 3 Drawing Sheets

(56) References Cited

U.S. PATENT DOCUMENTS

| | | | |
|---|---|---|---|
| 4,323,132 A | | 4/1982 | Bradley |
| 4,533,290 A | * | 8/1985 | Hackauf ............... 414/667 |
| 5,096,363 A | * | 3/1992 | Weinert et al. ............ 414/667 |
| 5,147,171 A | * | 9/1992 | Murray et al. ............ 414/671 |
| 5,190,436 A | * | 3/1993 | Sorlie ............... 414/667 |
| 5,336,039 A | * | 8/1994 | House ............... 414/621 |
| 5,368,435 A | * | 11/1994 | Bostad et al. ............ 414/667 |
| 7,026,557 B2 | | 4/2006 | Rice et al. |
| 2005/0186059 A1 | | 8/2005 | Foroni |
| 2007/0079558 A1 | * | 4/2007 | Foroni ............... 49/375 |

FOREIGN PATENT DOCUMENTS

| | | |
|---|---|---|
| JP | 2000327920 | 11/2000 |
| WO | 8200997 | 4/1982 |
| WO | 2007063188 | 6/2007 |

OTHER PUBLICATIONS

International Search Report for PCT/US2010/023268 dated Jun. 4, 2010.

* cited by examiner

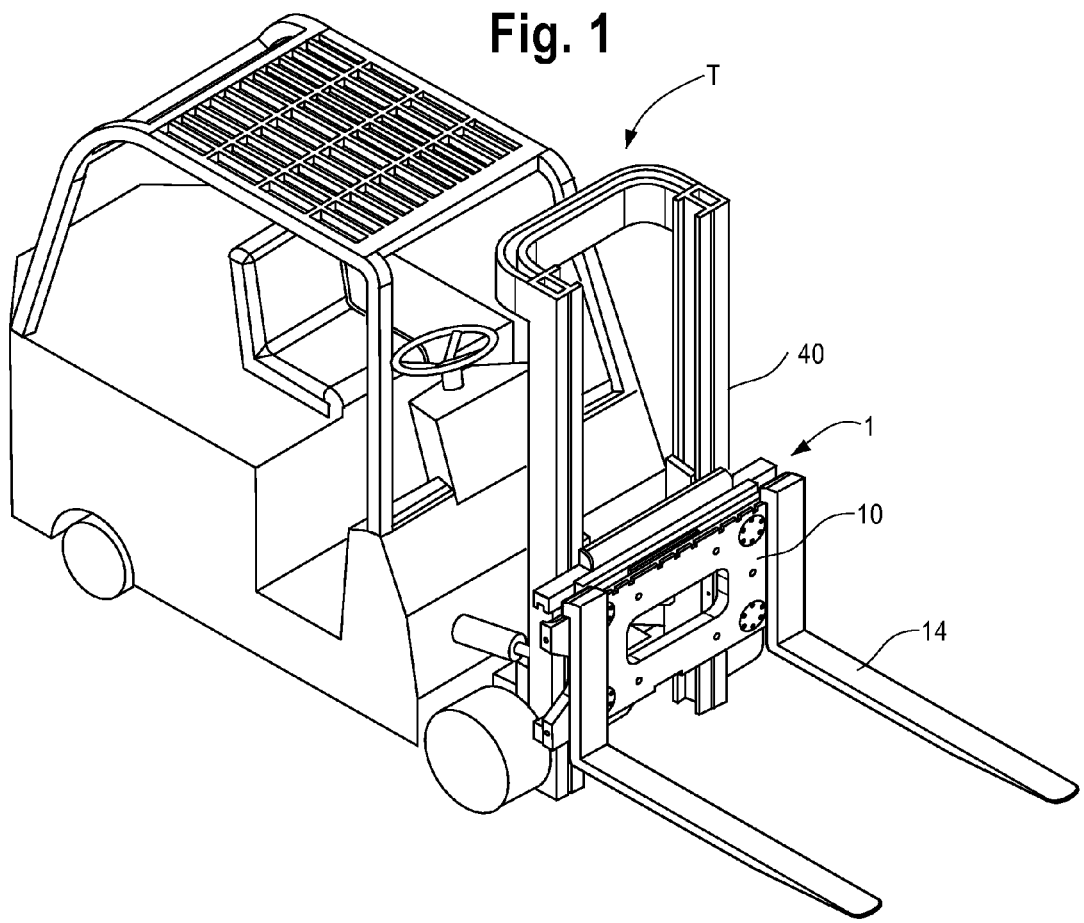
Fig. 1
Fig. 2
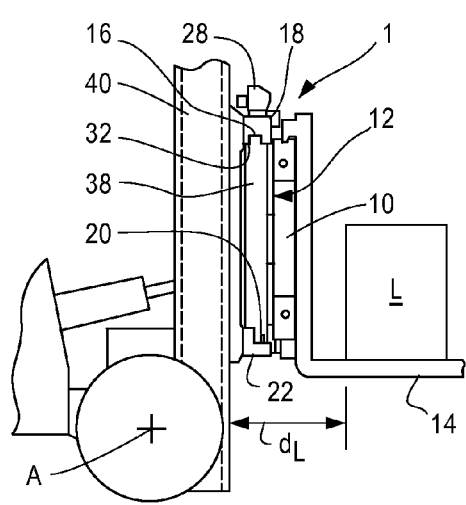
Fig. 3
PRIOR ART
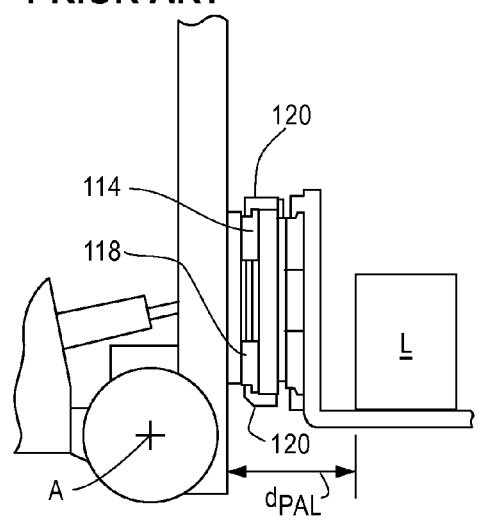

REDUCED LOAD OFFSET LOSS INTEGRATED LIFT TRUCK ATTACHMENT

CROSS-REFERENCE TO RELATED APPLICATION DATA

This application claims the benefit of priority of Provisional U.S. patent application Ser. No. 61/151,029, filed Feb. 9, 2009.

BACKGROUND OF THE INVENTION

Attachments to lift trucks are often added to a standard carriage that normally carries the lifting forks. This offsets the position of the lifting forks an additional distance from the front axle of the lift truck, reducing the lifting capacity of the lift truck.

A simplified approach to integrating a lift truck scale into a lift truck lifting structure is to rigidly attach some of the parts that are normally included within the fork lifting carriage assembly to the scale assembly. This provides only a marginally accurate scale that is sensitive to the lift truck load bearing structures flexibility.

Accurate scales are simply (not rigidly) attached to a lift truck so that deformations or deflections of the lift truck do not distort the scale causing it to be inaccurate. This is the nature of the nested lift truck attachment design. This nested attachment also makes the replacement or removal and repair to the attachments such as a lift truck scale similar to the hang-on type.

Prior art lift truck scales are provided by many manufactures such as Avery Weigh-Tronix, LTS, Allegany, Filing Scale Company, Rice Lake, Intercomp, MSI Scales and Bilanciai. These are examples of scales that simply hang on the lift truck in the location that the forks originally were located.

Another arrangement by Mettler Toledo provides an integrated scale, which is disclosed in Rice et al., U.S. Pat. No. 7,026,557. This scale is built into the lift truck lifting system with compensation for drag forces. The removal of the scale is very difficult and repairs to the scale are repairs to the lift truck.

Accordingly there is a need for an attachment for devices to be mounted to a lifting mechanism that reduces the horizontal offset distance. Desirably, such a device provides easy installation and removal. More desirably, such a lift truck carriage is provided that allows the attachment to nest within the lift truck carriage to reduce the loss of position by the thickness of the normal lift truck carriage thickness.

SUMMARY OF THE INVENTION

A lift truck attachment for attaching a device, such as a scale, to a lift truck, includes an upper carriage support, a lower carriage support spaced from and opposing the upper carriage support and a device attachment region disposed between and substantially flush with the upper and lower carriage supports. The device is attached between and nests with the upper and lower carriage supports.

The present lift truck attachment attaches the device between the upper and lower carriage supports and nests with the supports to reduce the effective distance between the lift truck mast and the load carrying members, such as the loading forks. This prevents the offset of the lifting forks an additional distance from the front axle of the lift truck, reducing the lifting capacity of the lift truck.

In a present configuration, the upper carriage support and lower carriage support are planar with one another and lie in a substantially vertical plane. As such, the device is mounted substantially planar with the carriage supports.

A groove can be formed in an underside of the upper carriage support and a resting edge can be provided on an upper surface of the lower carriage support rail so that the attachment region secures to the lower carriage support and mates with the upper carriage support groove.

The lift truck attachment can include a side shifting assembly mounted to the upper carriage support to move the device and the load side-to-side. The side shifting assembly can include an actuating cylinder.

One or more bearing surfaces can be provided on the upper and/or lower support rails.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein:

FIG. 1 is a perspective illustration of a lift truck having a reduced load offset loss integrated lift truck attachment;

FIG. 2 is a side view of the attachment on the lift truck;

FIG. 3 is a side view of a known attachment on a lift truck, shown to illustrate the offset;

DETAILED DESCRIPTION OF THE INVENTION

Figure 4:
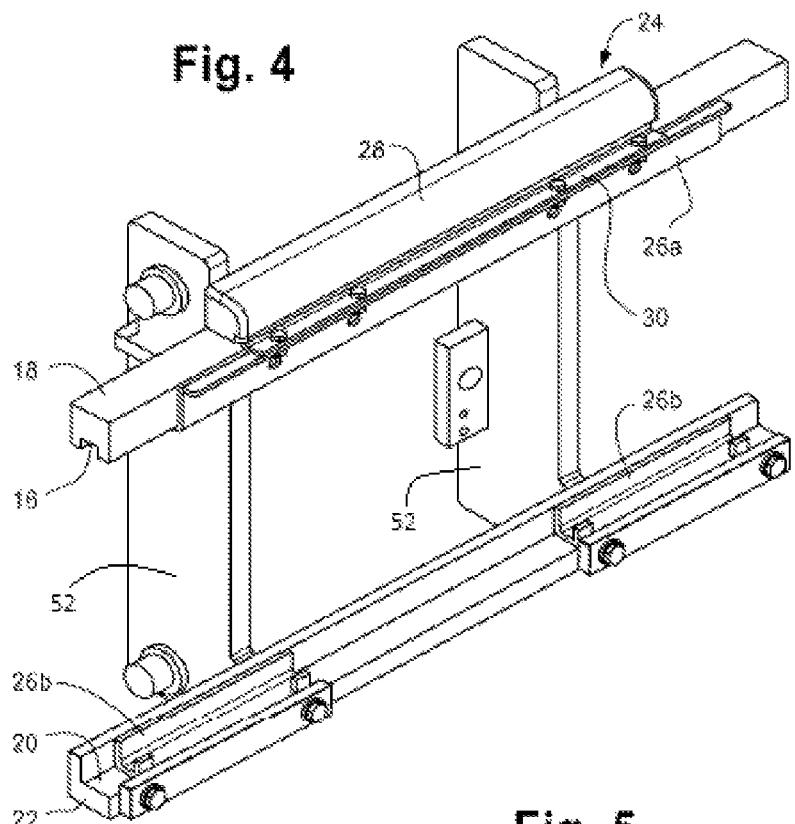
FIG. 4 is a perspective illustration of the lift truck carriage portion of the present attachment.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

Lift trucks or lifting machines that provide cantilevered load lifting means, are limited by the ability of the device to prevent the moment created by the load being applied an offset distance from the nearest support to ground. In portable machines such as a lift truck this moment must not exceed a reasonable portion of the stabilizing moment provided by the lift trucks weight at a distance from the support nearest the load.

The present reduced load offset loss integrated lift truck attachment can embody any one of a number of devices including: tippers, rotators, grips, lifting poles and forks. The lift truck attachment enables devices to be attached to the lift truck with minimal loss in lifting capacity due to offsetting the load (e.g., moving the load further from the front wheel axis of the truck). Essentially, the present attachment device is attached between the upper and lower carriage supports and nests with the upper and lower carriage supports to reduce the effective distance between the lift truck mast and the load carrying members, such as the loading forks. In addition, as will be appreciated by those skilled in the art, members that are not shown may be added to increase strength and stiffness.

Referring to FIGS. 1 and 2, there is shown a reduced load offset lift attachment 1 embodying the principles of the present invention. The attachment 1 is shown with a device 10 (shown as a weighing scale) that is attached to a lift truck T so that it nests inside the dimensions of the lift truck carriage 12. Lifting forks 14 are attached to the device 10, if required, positioning the load L farther from the front axle A of the lift truck T by only one addition plate thickness (the thickness of only the front half of scale 10) than it would be if there was no device 10 (scale) using a known attachment.

The offset load distance $d_L$, as shown in FIG. 2, is less than that of the prior known devices (as seen in FIG. 3), in that only two plate thicknesses are present, compared to the known devices that require three plate thicknesses (see $d_{LPA}$ in FIG. 3).

As seen in FIG. 4, the lift truck carriage 12 has an internal groove 16 on the under side of the top support rail 18 and an internal resting edge 20 on the upper surface of the bottom support rail 22. Prior known lift truck carriages (exemplary of which is that carriage 110 shown in FIGS. 3 and 5) have a ridge 112 on the upper surface of the top support rail 114 and a ridge 116 on the lower surface of the bottom support rail 118. The present device 10 on the other hand can be mounted inside of the lift truck carriage 12 by placing the device attachment features inside of the lift truck carriage 12. Essentially, in the present assembly 1, the device (scale) attachment features, which will be presented below, are coplanar with the device 10. This is unlike the prior known devices that mount in front of the lift truck carriage 110, displacing the load L farther from the lift truck axle A. As will be appreciated by those skilled in the art, a disadvantage of the prior known devices is that greater displacement reduces the effective lifting capacity of the lift truck. The lift truck carriage 12 also includes a pair of support brackets 52. The top support rail 18 and the bottom support rail 22 are each secured to and supported by the pair of support brackets 52.

Referring to FIG. 4, an additional device is also incorporated inside of and on the lift truck carriage 12. A side shifting assembly 24 includes slider bearings 26 within the lift truck carriage 12. Without the activation cylinder 28, the top bearing 26a is merely bolted in place and becomes the centering means for the device 10 mounting. The lift truck T can then be retrofitted with the side shifting assembly 24 by removing the bolts locking the top bearing 26a and installing the activation cylinder 28 with a bracket 30 attached to the top bearing 26a. Notably, the side shifting assembly 24 does not position the device (scale) 10 and load L farther from the lifting mechanism 40 (e.g., mast) of the lift truck T.

Figure 5:
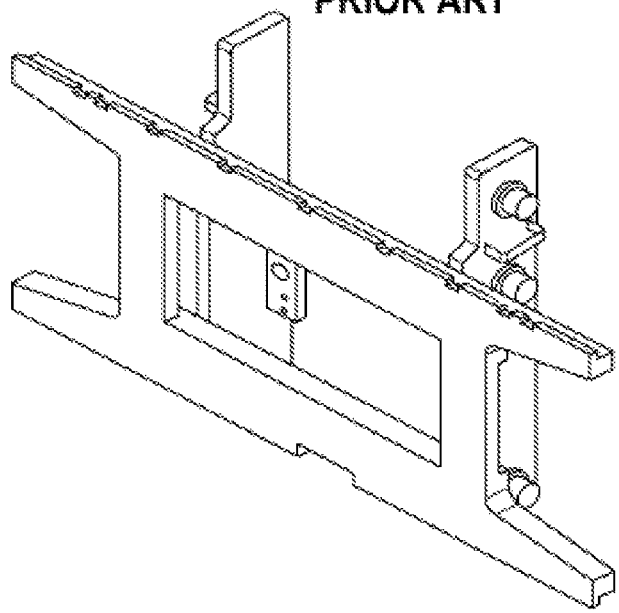
FIG. 5 is another perspective view of the known attachment on a lift truck.

Without the present attachment 1, the side shifter 24 would be located between the lift truck carriage 110 (as shown in FIG. 5) and the weighing scale (device) 10, also increasing the load L offset, by yet one more plate thickness for a total of four plate thicknesses. While the present attachment includes two devices, it nevertheless only offsets the load by two plate thicknesses.

Figure 6:
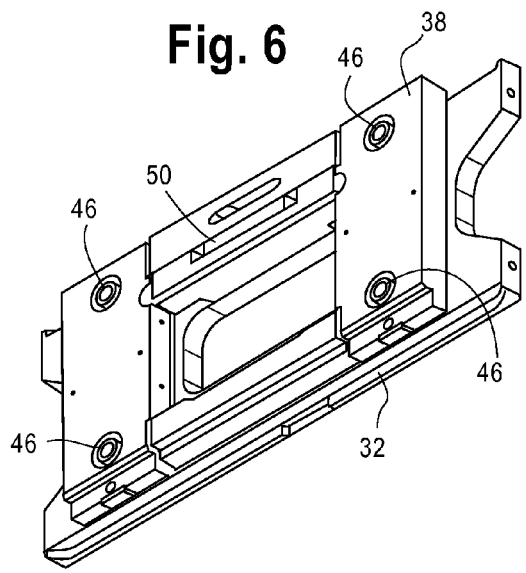
FIG. 6 is a rear perspective view of the scale device or portion of the present attachment.
Figure 7:
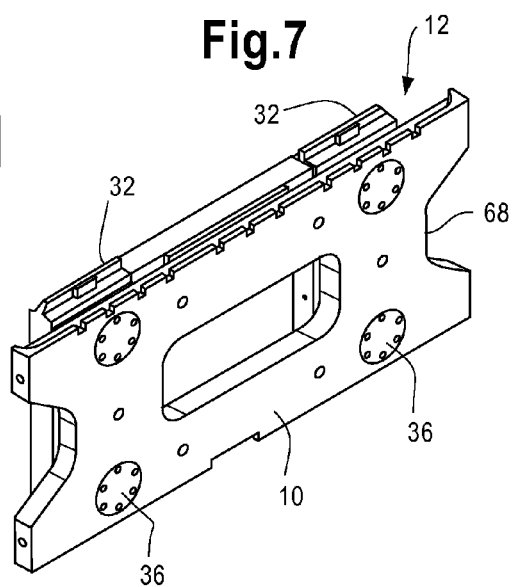
FIG. 7 is a front perspective view of the scale device or portion of the present attachment.

The scale portion device 10 of the attachment 1, which is illustrated in FIGS. 6 and 7, has attachment ears 32 to bear the force against the support rails 18, 22 of the lift truck carriage 12. Again, this compares to the prior known scale (referring to FIGS. 3 and 5), which has hooks 120 that attach externally to the lift truck carriage 110 bearing the load against the ridges 112, 116 in the support rails 114, 118.

Figure 8:
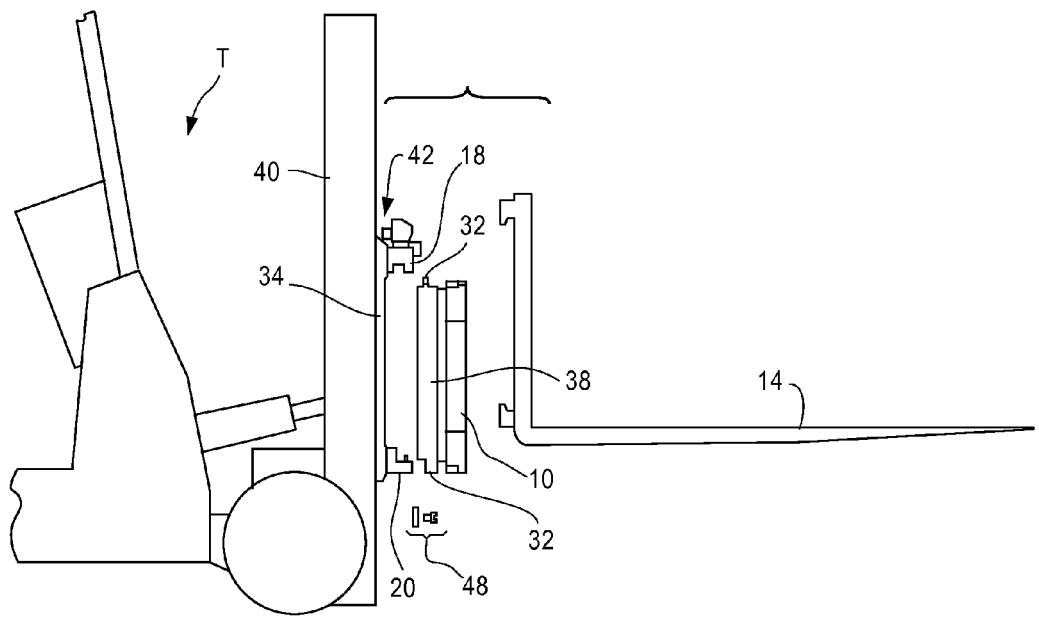
FIG. 8 is an exploded side view of the present attachment on a lift truck.

Details of the installation of the present attachment 1 are illustrated in FIG. 8. The attachment 1 may have components positioned inside of the carriage rails 12 and a retainer plate 34 that is bolted or fixed in place to keep the device 10 from being pulled out.

The attachment referred to can be a device such as the side shifter assembly 24 for allowing the device 10 (for example, the lift truck scale) to be side shifted.

In one embodiment, the present reduced load offset loss integrated lift truck attachment 1 includes the device 10 (as shown in FIGS. 6, 7 and 8) for performing a function, such as the scale with four load cells 36 connecting the carriage scale 68 to the base 38, that is movable by the lifting mechanism 40 on the carriage 12. The optional side shifter 24 permits shifting the device 10 side-to-side.

One contemplated reduced load offset loss integrated lift truck attachment 1 includes an attachment 42 for mounting to the lifting mechanism 40 and includes the load carriage 12 for receiving the load handling fixtures (forks 14), a mounting base 38 for attaching the device 10 mounting rails 18, 22, on the load carriage 12 above and below the mounting base 38 for attaching the base 38 to the load carriage 12, and a device connecting and for performing a function, such as the scale 10, between the lifting mechanism 40 and the load handling fixtures.

A present embodiment includes the device for performing a function (the scale 10) as having at least one load cell 36 and connections 46 for measuring the shear force between the base 38 and the carriage 12 and instrumentation (not shown) for providing a signal relative to the output from the load cell(s) 36. The (at least one) load cell 36 and instrumentation can also include horizontal members for bearing forces perpendicular to the line of sensitivity of the load cell. Devices other than scales can be incorporated into the lift truck attachment 1 such as rotators, extenders, lifting adapter clamps and the like, as will be recognized by those skilled in the art.

The attachment 1 can include the device (scale 10) and can also include a movable member 24 between the lifting mechanism 40 and the carriage 12. In one embodiment, the movable member 24 between the lifting mechanism 40 and the carriage 12 is configured to move the device 10 side-to-side.

A retainer 34 can be mounted to the device 10 and/or one of the rails 18, 22, to prevent the device 10 from inadvertently dislodging from the attachment 1.

Some of the benefits and advantages of the present attachment include: wireless integration of the load scale (load sensors/load cells) through a weight/load converter 50 to a monitor (not shown), slim design with minimal weight to minimize de-rate offset and a fully integrated design (including side shift integration 24 for fork 14 positioner—side-to-side positioning).

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover all such modifications as fall within the scope of the invention.

What is claimed is:

1. A lift truck attachment system comprising:
a pair of support brackets;
an upper carriage support secured to the pair of support brackets, the upper carriage support having a groove in an underside thereof;
a lower carriage support spaced from and opposing the upper carriage support and secured to the pair of support brackets;
a device attachment region disposed between and substantially flush with the upper and lower carriage supports; and
a device attached to the upper carriage support and lower carriage support, the device comprising a base portion positioned in the device attachment region extending continuously from the lower carriage support to the upper carriage support, the base portion comprising a plurality of attachment ears, wherein at least one attachment ear of the plurality of attachment ears is positioned in and bears against the groove of the upper carriage support and another attachment ear of the of the plurality of attachment ears bears against the lower carriage support such that the underside of the upper carriage support and an upper surface of the lower carriage support the base portion of the device and the base portion is nested between the upper and lower carriage supports, the device further including a load carriage connected to the base portion and offset from the device attachment region, the load carriage configured to receive load handling fixtures thereon.

2. The lift truck attachment system in accordance with claim 1 wherein the upper carriage support and lower carriage support are coplanar with one another and lie in a substantially vertical plane.

3. The lift truck attachment system in accordance with claim 1 including a resting edge on an upper surface of a lower carriage support, the lower carriage support having a generally 'L'-shaped cross section, wherein the device attachment region is configured to secure to the lower carriage support and to mate with the upper carriage support groove.

4. The lift truck attachment system in accordance with claim 3 including a side shifting assembly mounted to the upper carriage support.

5. The lift truck attachment system in accordance with claim 4 wherein the side shifting assembly includes an actuating cylinder.

6. The lift truck attachment system in accordance with claim 1 including one or more bearing surfaces on a lower carriage support.

7. The lift truck attachment system in accordance with claim 1 including one or more bearing surfaces on the upper carriage support.

* * * * *